United States Patent Office 3,702,321
Patented Nov. 7, 1972

---

3,702,321
PROCESS FOR PREPARING BENZODIAZEPINE DERIVATIVES
Hisao Yamamoto, Nishinomiya-shi, Shigeho Inaba, Takarazuka-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minoo-shi, Kazuo Mori, Kobe, Tsuyoshi Kobayashi, Minoo-shi, and Takahiro Izumi, Takarazuka-shi, Japan, assignors to Sumitomo Chemical Company, Ltd., Osaka, Japan
No Drawing. Filed Feb. 7, 1969, Ser. No. 797,708
Claims priority, application Japan, Apr. 2, 1968, 43/21,887; Apr. 4, 1968, 43/22,530; May 10, 1968, 43/31,466; May 17, 1968, 43/33,260; May 27, 1968, 43/36,249; June 13, 1968, 43/41,106
Int. Cl. C07d 51/72, 53/06, 57/02
U.S. Cl. 260—239 BD                    5 Claims

ABSTRACT OF THE DISCLOSURE

A 2,3-dihydro-1H-1,4-benzodiazepine derivative, which is useful as tranquillizer, hypnotic, muscle-relaxant and anticonvulsant, is produced by hydrolyzing a 2-(dioxopiperazino)-benzophenone derivative. The 2-(dioxopiperazino)-benzophenone derivative is prepared by treating a 3-phenyl-indole-2-carboxylic acid ester derivative with a reactive ester of cyanomethylalcohol, and reducing the resulting 1-cyanomethyl compound, and then contacting the resulting piperazino-indole derivative with a suitable oxidizing agent.

---

The present invention relates to a novel process for producing 2,3-dihydro-1H-1,4-benzodiazepine derivative.

More particularly, the present invention relates to a novel process for producing 2,3-dihydro-1H-1,4-benzodiazepine derivative represented by the general formula,

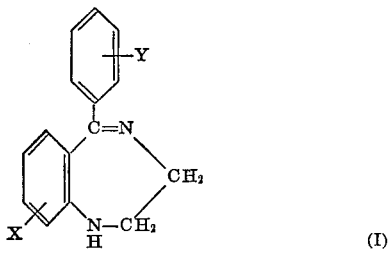

wherein X and Y mean a hydrogen atom, a halogen atom or a trifluoromethyl group.

The 2,3-dihydro-1H-1,4-benzodiazepine derivative represented by general Formula I and salts thereof are useful as tranquillizers, hypnotics, muscle relaxants and anticonvulsants, and are also useful as intermediates for other benzodiazepine derivatives which are effectively used as tranquilizers, muscle relaxants and anticonvulsants.

An object of the present invention is to provide a novel process for preparing 2,3-dihydro-1H-1,4-benzodiazepine derivatives.

Another object is to provide a novel process for preparing salts of benzodiazepine derivatives by treating the benzodiazepine derivative of Formula I with a mineral acid such as hydrochloric, sulfuric, nitric or phosphoric acid, or with an organic acid such as maleic, fumaric, succinic, formic, acetic or tartaric acid.

Other objects of the invention will become apparent from the description which follows.

A few processes for producing the benzodiazepine derivative of the Formula I have been described. For instance, the benzodiazepine derivative is prepared by cyclizing a 2-glycylamido-benzophenone derivative and reducing the resulting 2,3-dihydro-1H-1,4-benzodiazepine-2-one derivative (L. H. Sternbach, E. Reeder and G. A. Archer, J. Org. Chem., 28, 2456).

According to the process of the present invention, benzodiazepine derivatives of the Formula I and salts thereof are advantageously produced. This new and valuable process is different from the known methods and represents an improvement thereover. In the present invention, the 2,3-dihydro-1H-1,4-benzodiazepine derivative of the Formula I can be obtained by heating a 2-(dioxopiperazino)-benzophenone derivative represented by the formula,

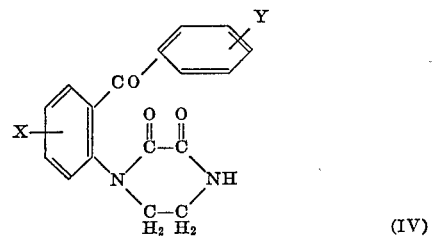

wherein X and Y have the same meanings as defined above, with a hydrolyzing agent.

The 2-(dioxo-piperazino)-benzophenone derivative represented by general Formula IV is a novel compound and it can be obtained, by treating a novel piperazinoindole derivative represented by the formula,

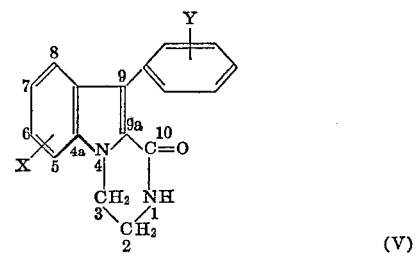

wherein X and Y have the same meanings as defined above, with an oxidizing agent.

The piperazinoindole derivative represented by Formula V can be prepared, by reducing a novel 1-cyano-methyl-3-phenyl-indole-2-carboxylic acid ester derivative of the formula,

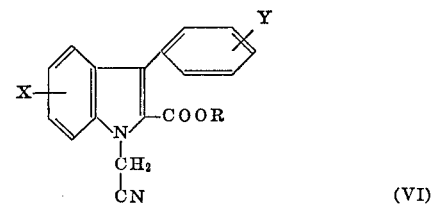

wherein X and Y have the same meanings as defined above and R means hydrogen atom or an alkyl group having 1 to 4 carbon atoms. The compound of Formula VI can be prepared, by contacting an indole derivative represented by the general formula,

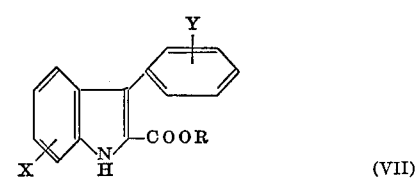

wherein X and Y have the same meanings as defined above and R means hydrogen atom or an alkyl group having 1 to 4 carbon atoms.

These processes for producing the 2,3-dihydro-1H-1,4- benzodiazepine derivative of the Formula I may be thus represented by the following reaction schema:

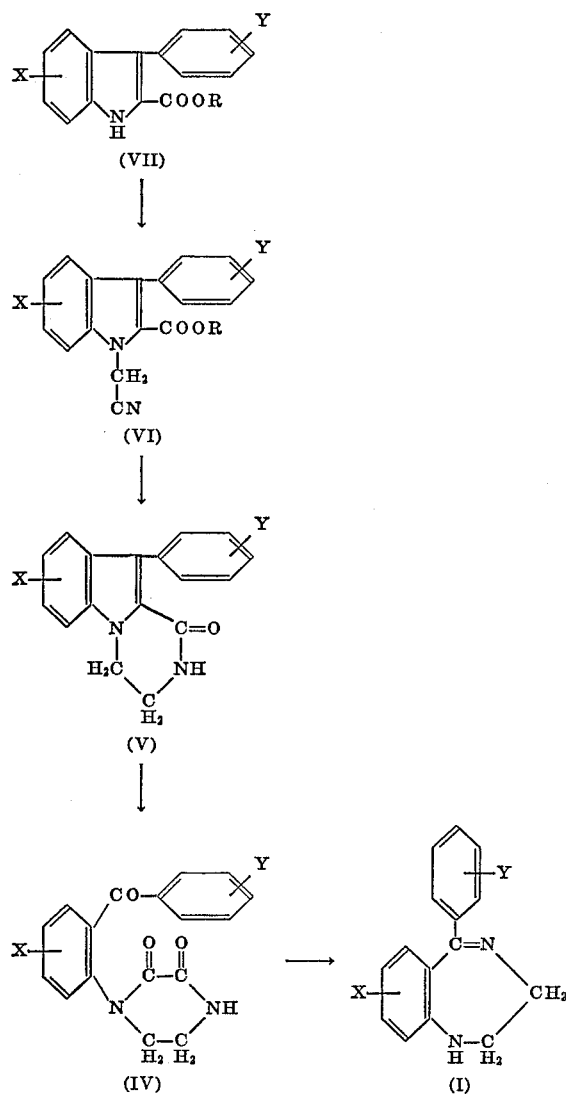

All of these processes proceed smoothly and give the objective products in high yields, and therefore these procedures are quite advantageous, in practice.

According to the process of this invention, the 2,3-dihydro-1H-1,4-benzodiazepine derivative of Formula I can be produced from the piperazinobenzophenone derivative of Formula IV by heating said derivative with a hydrolyzing agent in a suitable solvent, e.g. water, an alcohol such as methanol or ethanol or pyridine. Hydrolyzing agents used include, for example, alkali metal hydroxides, such as sodium hydroxide and potassium hydroxide; alkali metal carbonates, such as potassium carbonate; alkaline earth metal hydroxides, such as barium hydroxide and calcium hydroxide; and ammonium compounds, such as ammonium hydroxide. Hydroxides of alkali metals or alkaline earth metals are particularly preferably used.

The reaction is generally carried out at elevated temperature, preferably at the boiling temperature of the solvent employed.

The 2-(dioxopiperadino)-benzophenone derivative of Formula IV can be prepared by treating a piperazino indole- derivative represented by Formula V with a suitable oxidizing agent. Oxidizing agents used include, for example, ozone, hydrogen peroxide, peracids, such as peracetic acid, performic acid and perbenzoic acid; chromic acid and permanganate, etc. but is not limited to the named compounds. The reaction advantageously proceeds in the presence of a solvent. The solvents used are water, acetone, carbon tetrachloride, acetic acid and sulfuric acid or the like. The reaction may be generally carried out at room temperature, and it finishes within about 24 hours.

By the process described above, the following 2-(dioxopiperazine)-benzophenone derivatives may, for example be prepared:

2-(2″,3″-dioxo-piperazino)-benzophenone,
2-(2″,3″-dioxo-piperazino)-5-chloro-benzophenone,
2-(2″,3″-dioxo-piperazino)-5-bromo-benzophenone,
2-(2″,3″-dioxo-piperazino)-6-(or 4-)-chlorobenzophenone,
2-(2″,3″-dioxo-piperazino)-2′-chloro-benzophenone,
2-(2″,3″-dioxo-piperazino)-2,5-dichloro-benzophenone,
2-(2″,3″-dioxo)-piperazino)-4′,5′-dichloro-benzophenone,
2-(2″,3″-dioxo-piperazino)-2′-fluoro-5-chlorobenzophenone and
2-(2″,3″-dioxo-piperazino)-4′-bromo-5-chlorobenzophenone.

The piperazinoindole derivative represented by Formula V can be obtained from a 1-cyanomethylindole-2-carboxylic acid derivative of Formula VI by contacting it in a reducing agent.

The reaction is carried out advantageously by catalytic reduction. Catalysts used are platinum oxide, palladium, Raney nickel, nickel boride, Raney cobalt, and the like. The hydrogen may be used at an appropriate pressure, preferably atmospheric pressure. The reaction is usually carried out at room temperature but may be carried out at elevated temperatures.

By the process described above, the following novel piperazinoindole derivatives may, for example, be obtained:

7-chloro-9-phenyl-10-oxo-piperazino-(1,2-a)-indole,
7-chloro-9-(p-chlorophenyl)-10-oxo-piperazino-(1,2-a)-indole,
7-bromo-9-phenyl-10-oxo-piperazino-(1,2-a)-indole,
7-chloro-9-(o-fluorophenyl)-10-oxo-piperazino-(1,2-a)-indole and
6-chloro-9-phenyl-10-oxo-piperazino-(1,2-a)-indole.

The 1-cyanomethylindole-2-carboxylic acid derivative of Formula VI can be prepared by treating the indole derivative represented by Formula (VII) with a reactive ester of cyanomethyl alcohol in the presence of a basic condensing agent or after forming their basic metal salts by treating them with basic condensing agents.

Reactive esters of cyanomethyl alcohol used here include halides and sulfonic acid esters. The halides include chlorides, bromides and iodides, while the sulfonic acid esters include, for example, methylsulfonic acid ester, paratoluene sulfonic acid ester and β-naphthalene sulfonic acid ester.

Basic condensing agents used include, for example, alkali metals, alkaline earth metals, alkali metal hydrides, alkaline earth metal hydrides, alkali metal hydroxides, alkaline earth metal hydroxides, alkali metal amines, alkaline earth metal amides, alkali mehtal alkoxides, alkaline earth metal alkoxides, alkyl alkali metals and aryl alkali metals and the like. Sodium hydride, lithium hydride, sodium amide, potassium amide, and lithium amide are preferably used.

The reaction is usually carried out in a solvent. The solvents used are benzene, toluene, xylene, dimethyl formamide, dioxane and liquid ammonia or the like.

By the process described above, the following 1-cyanomethylindole-2-carboxylic acid derivatives may, for example, be obtained:

1-cyanomethyl-3-phenyl-indole,
1-cyanomethyl-2-methoxycarbonyl-3-phenyl-indole,
1-cyanomethyl-2-methoxycarbonyl-3-phenyl-5-chloro-indole,
1-cyanomethyl-2-ethoxycarbonyl-3-phenyl-indole,
1-cyanomethyl-2-etthoxycarbonyl-3-phenyl-5-chloro-indole,
1-cyanomethyl-2-ethoxycarbonyl-3-phenyl-5-bromo-indole,
1-cyanomethyl-2-ethoxycarbonyl-3-phenyl-6 (or 4)-chloro-indole,
1-cyanomethyl-2-ethoxycarbonyl-3-phenyl-7-chloro-indole,
1-cyanomethyl-2-ethoxycarbonyl-3-(o-chlorophenyl)-5-chloro-indole,
1-cyanomethyl-2-ethoxycarbonyl-3-(o-fluorophenyl)-5-chloro-indole and
1-cyanomethyl-2-ethoxycarbonyl-3-(p-chlorophenyl)-5-chloro-indole.

The present invention will be illustrated in further detail with reference to examples thereof. It should be understood, however, that these examples are merely illustrative and the present invention is not restricted only thereto.

EXAMPLE 1

1-cyanomethyl-2-ethoxycarbonyl-3-phenyl-5-chloro-indole

To a mixture of 1.1 g. of 50% sodium hydride and 10 ml. of dimethylformamide is added a solution of 6 g. of 2-ethoxycarbonyl-3-phenyl-5-chloro-indole in 30 ml. at 30°–35° C.

After stirring for 15 minutes, at 30° C., a solution of 1.7 g. of chloroacetonitrile in 10 ml. of dimethylformamide is added dropwise at 30°–35° C. and the mixture is stirred for 1 hour at 25°–30° C. Water is added thereto, and the mixture is extracted with ether. The ethereal layer is washed with water and dried over sodium sulfate. The solvent is removed by distillation to give 7 g. of a solid substance. To the solid is added 100 ml. of hexane and the mixture is filtered to give 5.5 g. of 1-cyanomethyl-2-ethoxycarbonyl-3-phenyl-5-chloro-indole. The crystals are recrystallized from a solvent mixture of benzene and hexane to give slightly yellow needles having a melting point of 126.5°–127° C.

According to the method similar to that of Example 1, the following compounds are obtained:

1-cyanomethyl-3-phenyl-indole,
1-cyanomethyl-2-methoxycarbonyl-3-phenyl-indole,
1-cyanomethyl-2-ethoxycarbonyl-3-phenyl-indole,
1-cyanomethyl-2-ethoxycarbonyl-3-phenyl-5-chloro-indole,
1-cyanomethyl-2-ethoxycarbonyl-3-phenyl-5-bromo-indole,
1-cyanomethyl-2-ethoxycarbonyl-3-phenyl-6 (or 4)-chloro-indole,
1-cyanomethyl-2-ethoxycarbonyl-3-phenyl-7-chloro-indole,
1-cyanomethyl-2-ethoxycarbonyl-3-(o-chlorophenyl)-5-chloro-indole,
1-cyanomethyl-2-ethoxycarbonyl-3-(o-fluorophenyl)-5-chloro-indole and
1-cyanomethyl-2-ethoxycarbonyl-3-(p-chlorophenyl)-5-chloro-indole.

EXAMPLE 2

7-chloro-9-phenyl-10-oxo-piperazino-(1,2-a)-indole

To a solution of 10 g. of 1-cyanomethyl-2-carboethoxy-3-phenyl-5-chloro-indole in 100 ml. of tetrahydrofuran is added a catalyst which is prepared from 50% Raney nickel alloy by treating with an aqueous solution of sodium hydroxide at 100° C. for one hour.

To the mixture is absorbed 2 moles of hydrogen under atmospheric pressure at 18° C. for 12 hours till the reduction is finished.

After the catalyst is removed by filtration, tetrahydrofuran is evaporated under reduced pressure and the residue is dissolved in hot ethanol.

The mixture is allowed to stand overnight in a refrigerator. The crystals produced are collected by filtration. Recrystallization from a mixture of ethanol and a small amount of benzene gives 3.6 g. of light yellow needles of 7-chloro - 9 - phenyl-10-oxo-piperazino-(1,2-a)-indole, melting point, 244.5°–245° C.

According to the method similar to that of Example 2, the following compounds are obtained:

7-chloro-9-(p-chlorophenyl)-10-oxo-piperazino-(1,2-a)-indole,
7-bromo-9-phenyl-10-oxo-piperazino-(1,2-a)-indole,
7-chloro-9-(o-fluorophenyl)-10-oxo-piperazino-(1,2-a)-indole and
7-chloro-9-(o-chlorophenyl)-10-oxo-piperazino-(1,2-a)-indole.

EXAMPLE 3

2-(2″,3″-dioxo-piperazino)-5-chloro-benzophenone

To a mixture of 1.6 g. of 7-chloro-9-phenyl-10-oxo-piperazino-(1,2-a)-indole and 35 ml. of acetic acid, is added a solution of 1.6 g. of chromic anhydride in 2 ml. of water at 10° C. The mixture is stirred for 16 hours at 20° C. and then poured into 500 ml. of water.

After adjusting the pH to 7–8 with aqueous ammonia, the reaction mixture is extracted with chloroform. The chloroform layer is washed with water and dried over sodium sulfate, and the solvent is removed by distillation to give 1.5 g. of a light yellow solid. Recrystallization from aqueous ethanol gives colorless crystals of 2-(2″,3″-dioxo-piperazino)-5-chloro-benzophenone having a melting point of 198° C. By the method similar to that of Example 3, the following compounds are obtained:

2-(2″,3″-dioxo-piperazino)-benzophenone,
2-(2″,3″-dioxo-piperazino)-5-bromo-benzophenone,
2-(2″,3″-dioxo-piperazino)-6 (or 4)-chloro-benzophenone,
2-(2″,3″-dioxo-piperazino)-2′-chloro-benzophenone,
2-(2″,3″-dioxo-piperazino)-2′,5-dichloro-benzophenone,
2-(2″,3″-dioxo-piperazino)-4′,5-dichloro-benzophenone,
2-(2″,3″-dioxo-piperazino)-2′-fluoro-5-chloro-benzophenone and
2-(2″,3″-dioxo-piperazino)-4′-bromo-5-chloro-benzophenone.

EXAMPLE 4

5-phenyl-7-chloro-2,3-dihydro-1H-1,4-benzodiazepine (a) To a solution of 2 g. of sodium hydroxide in 5 ml. of water and 50 ml. of ethanol is added 3.3 g. of 2-(2″,3″ - dioxo-piperazino)-5-chloro-benzophenone. The mixture is heated under reflux for 3 hours. After addition of 50 ml. of water, the reaction mixture is further heated under reflux for 17 hours and most part of ethanol is distilled off. To the residue is added 200 ml. of water and the mixture is heated at 80° C. to pulverize. The powder is collected by filtration to give 2 g. of 5-phenyl-7-chloro-2,3-dihydro-1H-1,4 - benzodiazepine. Recrystallization from ethanol gives yellow crystals having a melting point of 173° C.

EXAMPLE 5

5-phenyl-2,3-dihydro-1H-1,4-benzodiazepine (a) 5-phenyl-2,3-dihydro-1H-1,4-benzodiazepine, M.P. 144°–146° C. is prepared from 2-(2″,3″-dioxo-piperazino)-benzophenone according to method similar to that of Example 4-(a). The product is recrystallized from petroleum-ether.

EXAMPLE 6

5-phenyl-7-bromo-2,3-dihydro-1H-1,4-benzodiazepine (a) 5 - phenyl-7-bromo-2,3-dihydro-1H-1,4-benzodiazepine, M.P. 173°–175° C. is prepared from 2-(2″,3″-dioxo-piperazino) - 5 - bromobenzophenone according to a method similar to that of Example 4-(a).

EXAMPLE 7

5-(o-chloro-phenyl)-7-chloro-2,3-dihydro-1H-1,4-benzodiazepine (a) 5 - (o-chloro-phenyl)-7-chloro-2,3-dihydro-1H-1,4-benzodiazepine, M.P. 175°–177° C., is prepared from 2-(2″,3″-dioxo-piperazino) - 2′,5 - dichloro-benzophenone according to a method similar to that of Example 4-(a).

EXAMPLE 8

5-(o-fluoro-phenyl)-7-chloro-2,3-dihydro-1H-1,4-benzodiazepine (a) 5 - (o-fluoro-phenyl)-7-chloro-2,3-dihydro-1H-1,4-benzodiazepine, M.P. 161°–163° C. is prepared from 2-(2″,3″-dioxo-piperazino) - 5 - chloro-2′-fluoro-benzophenone according to a method similar to that of Example 4-(a).

EXAMPLE 9

5-phenyl-7-trifluoromethyl-2,3-dihydro-1H-1,4-benzodiazepine and its hydrochloride (a) 5-phenyl - 7 - trifluoromethyl-2,3-dihydro-1H-1,4-benzodiazepine, M.P. 110°–111° C., is prepared from 2-(2″,3″-dioxo-piperazino) - 5 - trifluoromethylbenzophenone according to a method similar to that of Example 4-(a).

(b) Methanolic hydrochloric acid is added to a solution of 5-phenyl - 7 - trifluoromethyl-2,3-dihydro-1H-1,4-benzodiazepine in methanol at 10° C. and the mixture is stirred for 1 hour at room temperature. The solvent is removed under reduced pressure and the residue is washed with benzene to give 5-phenyl-7-trifluoromethyl-2,3-dihydro - 1H - 1,4 - benzodiazepine hydrochloride. Recrystallization from methanol-ether gives yellow crystals having a melting point of 283°–285° C.

What we claim is:

1. A process for producing 2,3-dihydro-1H-1,4-benzodiazepine derivatives of the formula,

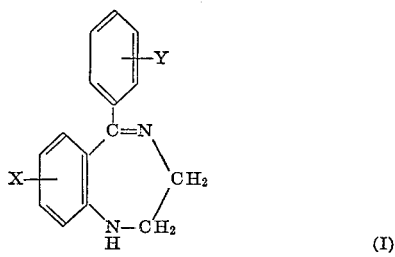

(I)

wherein X and Y each signify a hydrogen atom, a halogen atom or a trifluoromethyl group, which comprises heating, with a hydrolyzing agent, a 2-(dioxo-piperazino)-benzophenone derivative of the formula,

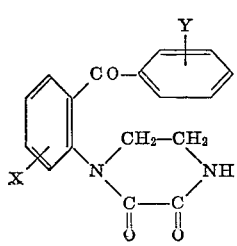

(IV)

wherein X and Y are same as defined above and wherein said hydrolyzing agent is an alkali metal hydroxide, an alkali metal carbonate, an alkali earth metal hydroxide or an ammonium hydroxide.

2. A process for producing 2,3-dihydro-1H-1,4-benzodiazepine derivatives of the formula,

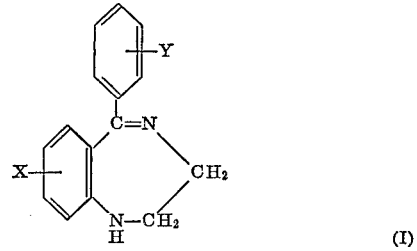

(I)

wherein X and Y each signify a hydrogen atom, a halogen atom or a trifluoromethyl group, which comprises contacting, with an oxidizing agent, a piperazinoindole derivative of the formula,

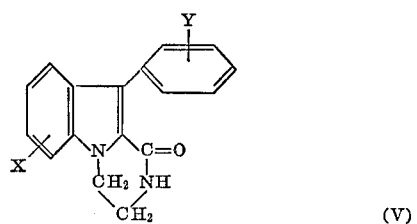

(V)

wherein X and Y each signify a hydrogen atom, a halogen atom or a trifluoromethyl group and heating, with a hydrolyzing agent, the resulting 2-(dioxo-piperazino)-benzophenone derivative of the formula,

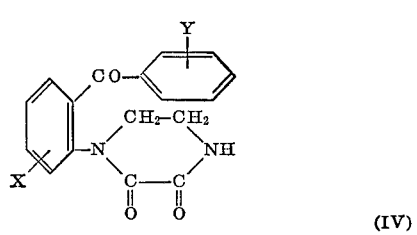

(IV)

wherein X and Y are same as defined above to produce said 2,3-dihydro-1H-1,4-benzodiazepine derivative.

3. A process according to claim 2, wherein the oxidizing agent is ozone, hydrogen peroxide, a peracid, a chromic acid or a permanganate.

4. A process for producing 2,3-dihydro-1H-1,4-benzodiazepine derivatives of the formula,

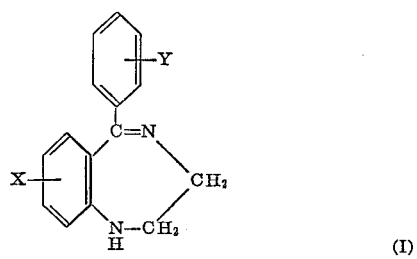

(I)

wherein X and Y each signify a hydrogen atom, a halogen atom or a trifluoromethyl group, which comprises contacting, with a reducing agent, a 1-cyanomethylindole-2-carboxylic acid derivatives of the formula,

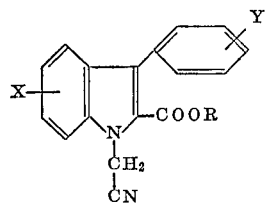

(VI)

wherein X and Y each signify a hydrogen atom, a halogen atom or trifluoromethyl group, and R signifies an alkyl group having 1 to 4 carbon atoms, and contacting, with an oxidizing agent, the resulting piperazinoindole derivative of the formula

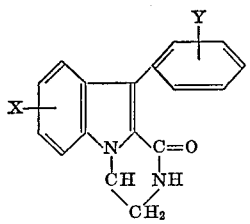

(V)

wherein X and Y are same as defined above and heating, with a hydrolyzing agent, the resulting 2-(dioxo-piperazino)-benzophenone derivative of the formula,

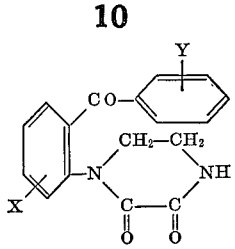

(IV)

wherein X and Y are same as defined above to produce said 2,3-dihydro-1H-1,4-benzodiazepine derivative.

5. A process according to claim 4, wherein the reduction is carried out by contacting the 1-cyanomethyl-indole-2-carboxylic acid derivative with hydrogen in the presence of a catalyst comprising platinum oxide, palladium, Raney nickel, nickel boride or Raney cobalt.

References Cited

UNITED STATES PATENTS 3,109,843   11/1963   Reeder et al. _____ 260—239

ALTON D. ROLLINS, Primary Examiner

U.S. Cl. X.R.

260—268 T R, 268 D K, 326.13 R, 456 R, 456 P; 424—244